A. DUFOULT.
Shoemakers' Lasting Pincers.
No. 133,521. Patented Dec. 3, 1872.
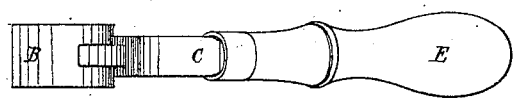
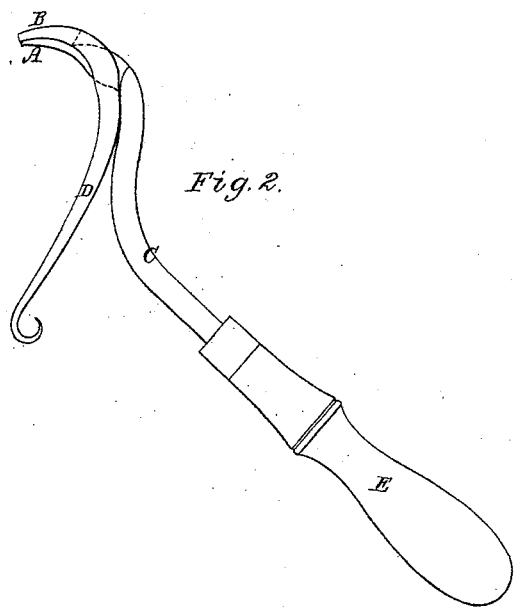
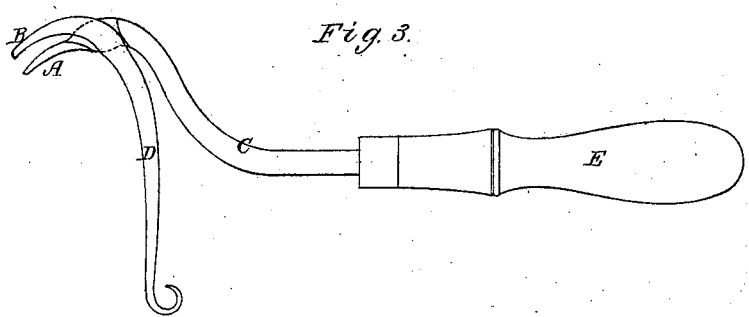

UNITED STATES PATENT OFFICE.

ABRAHAM DUFOULT, OF SPENCER, MASSACHUSETTS.

IMPROVEMENT IN SHOEMAKERS' LASTING-PINCHERS.

Specification forming part of Letters Patent No. 133,521, dated December 3, 1872.

*To all whom it may concern:*

Be it known that I, ABRAHAM DUFOULT, of Spencer, of the county of Worcester and State of Massachusetts, have invented a new and useful or Improved Pinchers for use in Lasting the Uppers of Shoes; and I do hereby declare the same to be fully described in the following specification and represented in the accompanying drawing, of which—

Figure 1 is a top view; Fig. 2, a side elevation of the implement as it appears with its jaws closed; and Fig. 3 represents a side view of it as it appears with its jaws open.

In operating with the common hammer-head lasting-pinchers a workman has to grasp both jaw arms or levers at once in his hand, using the hammer-head as a fulcrum to effect the straining of the upper on the last; but with my improved article, which has no hammer-head, he grasps one lever only, employing the other as a fulcrum or bearing. With my implement he is saved all necessity of squeezing together the jaw-levers with his hand in order to confine the jaws upon the leather while he is stretching it upon the last, as my lasting-pinchers close firmly upon the leather under the force exerted to draw or stretch it upon the last. In this respect they are automatic in their action and differ materially from the ordinary hammer-head pinchers.

In the drawing, A and B are two curved jaws, projecting from two short curved arms or levers, C D, formed as represented, one of them being longer than the other and provided with a wooden handle, E. The lever C extends through and is jointed or pivoted to the lever D, which carries the inner jaw A, the outer jaw being fixed to the shorter or bearing lever D. The shorter lever, with its jaw, has a form in longitudinal section analogous to what architects term an "ovolo," the longer lever with its jaw, having what is termed a wave, cyma, or serpentine form, the longer lever, terminating in a shank to receive or enter the handle, all being as shown in the drawing. When the handle is horizontal, or thereabout, the shorter lever when out of contact with any article will by its gravitating power open the jaws or elevate the outer with respect to the inner jaw.

In using my implement the shorter arm does not bear directly down upon the bottom piece of the insole, as does the hammer-head of the common lasting-pinchers, but rests and slides against the edge of the sole and last, the same enabling the head to be dispensed with, and thereby avoiding the strain and injury usually resulting to the sole from its use.

In some respects—that is, in having two jaws and two arms or levers—my implement is like the common hammer-head lasting-pinchers; but I have dispensed entirely with the hammer-head, and I have also so formed the arms and applied a handle to one of them as to enable the implement to be used differently—viz., by the hand grasping the handle only, and with the shorter arm resting against the side of the last.

I make no claim to the lasting-pinchers shown and described in the United States Letters Patent No. 87,773, to Henderson, my combination of pinchers enabling me to dispense with the spring and several other devices incident to Henderson's pinchers.

With my pinchers the longer arm of the upper jaw-lever, when the pinchers are in use, bears directly upon the sole or shoe, which is not the case with the longer arm of the upper jaw-lever of Henderson's laster.

Therefore, while I make no claim to the common pinchers, as usually made or provided with a hammer-head, and used for lasting the upper of a shoe,

I claim as my invention—

The improved manufacture or lasting pinchers, consisting of the pivoted jaws A B, their two levers, C D, and handle E, arranged and constructed as described and represented.

ABRAHAM DUFOULT.

Witnesses:
R. H. EDDY,
J. R. SNOW.